(12) United States Patent
Bird

(10) Patent No.: US 10,412,213 B2
(45) Date of Patent: Sep. 10, 2019

(54) SYSTEM FOR PRODUCING CALLER IDENTIFICATION METADATA

(71) Applicant: TCN Incorporated, St. George, UT (US)

(72) Inventor: Jesse Bird, St. George, UT (US)

(73) Assignee: TCN Incorporated, St. George, UT (US)

( * ) Notice: Subject to any disclaimer, the term of this patent is extended or adjusted under 35 U.S.C. 154(b) by 0 days.

(21) Appl. No.: 15/884,007

(22) Filed: Jan. 30, 2018

(65) Prior Publication Data

US 2019/0238677 A1    Aug. 1, 2019

(51) Int. Cl.
*G01S 1/08* (2006.01)
*H04M 3/42* (2006.01)
*H04M 3/51* (2006.01)
*H04M 3/436* (2006.01)

(52) U.S. Cl.
CPC ... *H04M 3/42042* (2013.01); *H04M 3/42059* (2013.01); *H04M 3/436* (2013.01); *H04M 3/51* (2013.01)

(58) Field of Classification Search
CPC ...... H04M 3/5191; H04M 7/003; H04M 1/57; H04M 2203/1058; H04M 3/42042; G06Q 50/01; H04L 67/02

USPC ........... 379/142.06, 88.26, 265.09; 455/440, 455/456; 342/463
See application file for complete search history.

(56) References Cited

U.S. PATENT DOCUMENTS

| | | |
|---|---|---|
| 7,899,169 B2 | 3/2011 | Siminoff |
| 8,565,399 B2 | 10/2013 | Ferguson |
| 9,282,186 B2 | 3/2016 | Siminoff |
| 9,288,317 B2 | 3/2016 | Siminoff |
| 2016/0173693 A1* | 6/2016 | Spievak ............. G06Q 30/0202 379/265.09 |

* cited by examiner

*Primary Examiner* — Phuoc H Doan
(74) *Attorney, Agent, or Firm* — Durham Jones & Pinegar, P.C., Intellectual Property Law Group

(57) ABSTRACT

A system and method for increasing meta data with a call center system to provide increased caller ID and agent skill matching. A system may include pre-populated meta data from a given phone number. A processor may include pre-programmed logic sequences for increasing meta data for the system by providing signal outputs to other sources and vendors to request the missing meta data. The information obtained from the other sources is input into the memory of the system for another logic sequence to act upon to provide the phone number or a call to the best possible and available agent based on agent skills and other information. Agents are able to access all the meta data prior to, during or after the call. Inbound and outbound calls may each utilize the system.

18 Claims, 8 Drawing Sheets

SYSTEM FOR PRODUCING CALLER IDENTIFICATION METADATA

TECHNICAL FIELD

This disclosure relates generally to predicting and real time analysis of phone calls and more specifically, to methods and systems and computer readable media for system automation in making calls and call flow for businesses and call centers.

BACKGROUND OF RELATED ART

Call centers have long been utilized by businesses to obtain feedback from current customers, potential customers or former customers. Call centers may often use information or data from phone numbers and provide that data to a system that populates the information into the system. This data collected from phone numbers may be further populated by the system producing additional data that may be uploaded into a server that may be accessible by a user. All the data collected that may be tied a particular phone number may be referred to herein as "meta data."

Often data collected from a phone number may be easily attributable and collected via a single source or vendor or a few sources or vendors. These types of meta data include area code; state; city; country code; or time zone. Many other types of meta data may also be collected or accessibly and by no means are any of these exhaustive.

Meta data is commonly used in the in telephone marketing and marketing fields to produce the best and targeted results. Meta data may be easily gathered and established based on simple feedback regarding the phone number itself. Other meta data may need retrieved from alternate sources or vendors or may even be input by a system automatically or even by a user manually.

SUMMARY

Disclosed herein is a system to enhance meta data collection and usage for caller ID selection in utilizing caller systems and predictive dialing systems; and additionally enhancing agent skill matching with the enhanced meta data. For example, the current system not only provide increased meta data information to the system but also provide that call to the proper agent with the proper skill to have the greatest success on that call. The entire system will produce a more effective call with increase information with the best or ideal agent to produce a successful call.

In one embodiment meta data may be gathered by a first system. This meta data may include, but is not limited to: country; postal code or zip code; postal type; city name; city type; country name; county FIPS; province name; province abbreviation; state FIPS; MSA code; area code; time zone; UTC; daylight savings (DST); latitude; longitude; phone type; region code. region name; city, telephone block; country dialing code; national prefix; and international prefix. The first system, after gathering the meta data may be utilized in a second system to enhance a system's ability in caller identification ("caller ID") selection. The metadata that is gathered by the first system may now be used to populate the second system to populate fields and allow the second system to produce a caller ID from a group of caller IDs for any given call utilizing the meta data from the caller ID information and from the phone number that is being called as well as those rules governing the selection of the caller ID and phone number. The rules may be predisposed logic pathways pertinent to every call or may be user input rules that are input into the system to create specific logic pathways for the system to follow with regard to specific set of calls.

It will be appreciated that even further information may be collected or utilized with a meta data gathering, including name, address and e-mail. Each successive piece of meta data enhances the ability for the system to provide a better calling and caller experience.

It is to be understood that the system and methods provided herein can be utilized as a software program within a computer-readable medium, may be hardware based, may be based and managed in the cloud or any variation there between. The features of the system and method may be employed in a number of current systems and in a number of different ways that may be automatic or customizable. This description may set forth certain embodiments but each may be mixed and matched and each is clearly contemplated herein.

DETAILED DESCRIPTION

Figure 1:
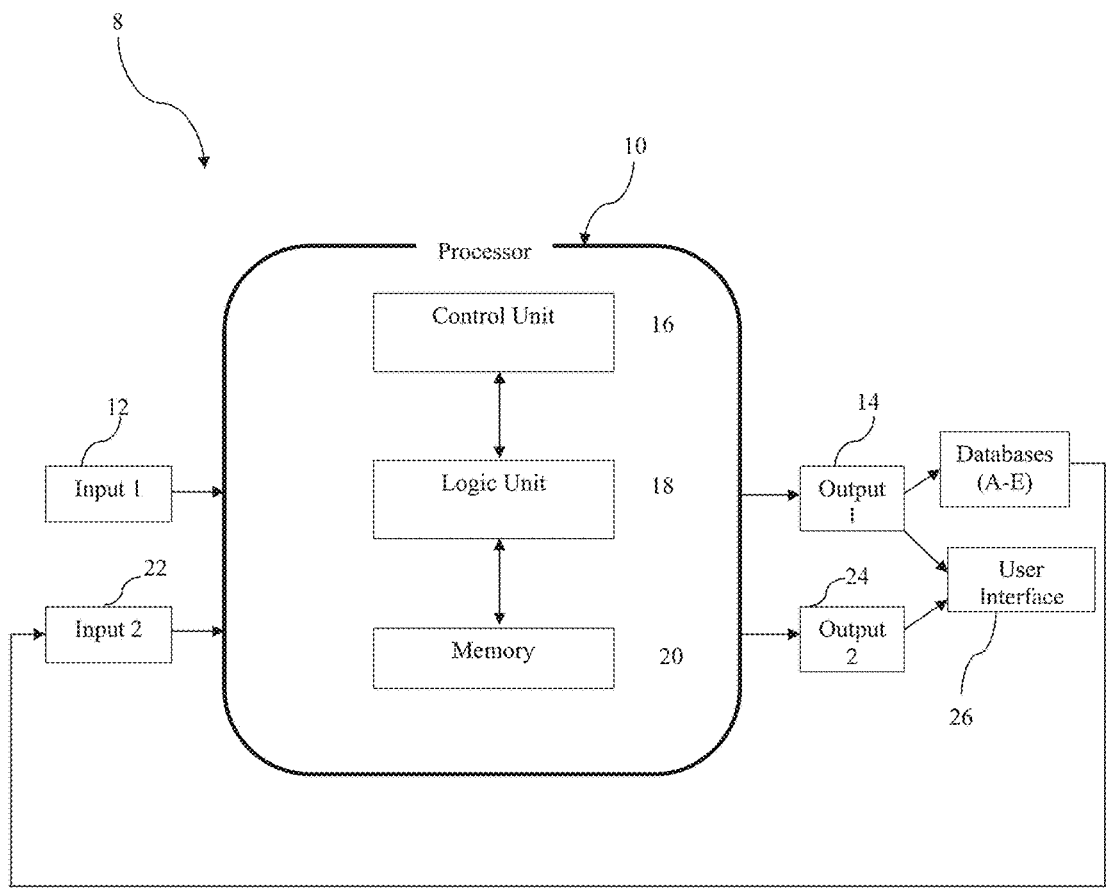
FIG. 1 illustrates a schematic of an embodiment of a processor with an input function, a control unit, memory, a logic unit and an output function.

Referring in general to the accompanying drawings, various embodiments of the present method and system are illustrated to show a system and methods for predictive and real time dialing analysis. The analysis may then allow the predictive dialing to be more accurate and on point based on the actual real time data collected during each successive call. The figures illustrate common elements. It should be understood that the figures presented are not meant to be illustrative of actual views of any particular portion of the actual device structure, but are merely schematic representations which are employed to more clearly and fully depict embodiments of the system.

The following provides a more detailed description of ways to implement the present system and method and various representative embodiments thereof. The following description sets forth the proper system and method for call center software and the gathering of meta data. In various embodiments, methods, devices, systems, and computer-readable media for controlling one or more call systems via a computer feedback program are disclosed. As an example, a call may be placed or received and processed through a system based on the information provided within the call itself and may be provided to an agent based on the information that is entered into the system from the call as well.

In this description, some drawings may illustrate signals as a single signal for clarity of presentation and description. It will be understood by a person of ordinary skill in the art that the signal may represent a bus of signals, wherein the bus may have a variety of bit widths and the present description may be implemented on any number of data signals including a single data signal.

A system for producing greater meta data may include a number of methods for monitoring and providing feedback. A plurality of data bases may be accessed or "pinged" as well as the information produced from the system itself and the agent's privy to the call. Multiple variations on the theme of data production, data gathering and data consolidation will be disclosed further herein and it will be appreciated, by one of ordinary skill in the art, that functional changes may be implemented in each embodiment.

The method and system described herein may require a computer, tablet, cell phone, smart phone or other computing device with a processor for carrying out specific actions. The system may communicate over the internet, through Ethernet, through wired or wireless connections. The system may communicate with a plurality of databases and information centers depending on the need for greater meta data to populate the system as well. The system may also communicate with a single agent, supervisor, client or customer; or multiple agents, supervisors, clients and customers.

The system may be maintained on a platform that is either on the cloud, or physically housed in a separate location, or at the location of a customer or client. The system may provide notifications to the user, agent, supervisor or client (i.e. "user"). A notification may be provided to a user when the necessary meta data has been gather for a single number, a series of numbers or a plurality of numbers after processed through the processor and populating the system.

The system is capable of performing in either an in-call or out-call method depending on the call type and user preferences. While it may be true that the system may perform slightly different functions depending on the call type the basic flow may be similar.

Examples of meta data that may be connected to a phone number may include, are not limited to, the country, the postal code or zip code, the postal type, the city name, the city type, the county name, the county FIPS, the province name, the province abbreviation, the state FIPS, the MSA code, the area code, the time zone, the UTC, the daylight savings time, the latitude, the longitude, the phone type, the region code, the region name the city, the telephone block, the country dialing code the national prefix the international prefix, etc. Furthermore the system may be able to obtain and utilize more specific or general demographic information that may be utilized by a user or agent. Beyond what is only obtainable through databases for phone numbers if an individual provides a user with additional information, such as name, address and/or email further meta data may then be connected with the phone number that further populates the system and provides a user an agent greater information regarding the person with whom the agent is talking or with whom the agent is about to talk with.

The result is an enhancement of data for the client and agent to utilize to better understand the caller and the target audience. The meta data may be utilized for better caller identification as well as increased matching of an agent skill set with the specific call. Increased meta data is obtained and utilized and will be further described herein.

FIG. 1 illustrates a system 8 with a processor that receives an input and provides an output. An input 12, or first series of inputs, may be a command or the like that may flow into the processor 10. The input 12 command may be an inbound call or number, an outbound call or number or the like. The input 12 may be user generated, automatically generated such a system generated or it may be generated from a third party input, such as a call into the system. The processor 10 may include a control unit 16 that may that may produce a first output 14, or first series of outputs, after being processed through a logic unit 18. The processor 10 may also include memory 20 that maintains pre-programmed functions and information that may be utilized by the logic unit 18 to further populate and be stored in the memory 16. The memory 16 may include commands that when processed through a logic unit that then produces the first output 14 which may be a notification to a database or alternate system that may populate meta data into the system 8 that may be accessible by a user to utilize in making better calling decisions and producing better results by providing a call to the best available agent.

The processor 10 may provide multiple outputs 14 depending on the status of the logic unit 18. As will be provided further herein, the logic sequences may provide information to the control unit to output a first command and after receiving a separate input 22, or second input, or second series of inputs, depending on the logic sequence 18 may provide the control unit 16 with a second command to a second output 24, or second series of outputs, to provide the information from the second input 22 to the user. The first input 12 may be a phone number with basic phone number information that is processed through the memory with an initial output 14 of information, or meta data, that was previously stored in the memory 20 and provided to a user interface to utilize in the phone call. Alternatively the first output 14 may be an output to a database or alternate system that is maintaining greater information than the current system 8 maintains. The first output may be a request for information based on the logic sequence 18 request through the control unit 16. After the other system or database information, further meta data, is retrieved it is input through the second input 22 into the processor 10 of the system 8. The memory may further accept and maintain the additional metadata in the system 8. The logic sequence 18 may then further evaluate the information and provide a signal to the control unit 16 to create a second output 24 to a user with the greater meta data for a user to utilize.

Figure 2:
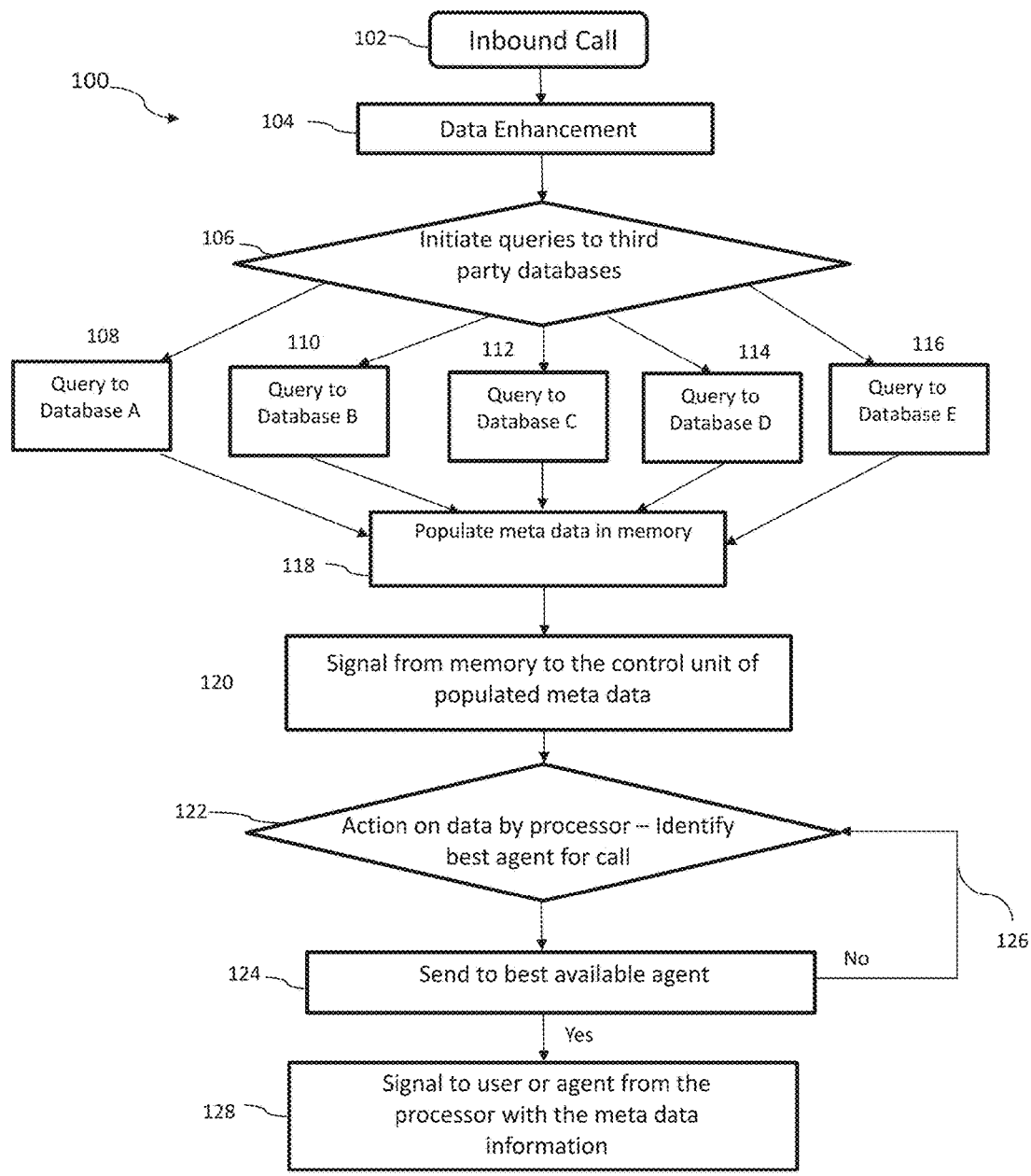
FIG. 2 illustrates a first process flow diagram which be used by the processor of FIG. 1 which may be for an inbound call.

FIG. 2 illustrates a system 8 with a first possible configuration of logic (100) that may be carried out within the processor to control the production and use of meta data and its retrieval and output 14, 24 in response to input 12, 22 from a chosen phone number for an inbound call. The processor 14 may start the logic (100) by receiving an input 12 which may be an inbound call (102) from an individual. Data enhancement (104) occurs with the logic 18 initiating queries or inquiries (106) to other databases which may be many different databases (108) (110) (112) (114) (116) or to a single data base. The queries (106) may occur simultaneously from a single output 14 or multiple output 14 queries. The queries (106) may be any of the many pieces of meta data previously disclosed herein or other pieces of meta data in addition to those previously listed herein. The queries (106) to a first database (108), which may be any one of (108) (110) (112) (114) (116) may be the same or different than the subsequent databases which may be any one of (108) (110) (112) (114) (116) and the same or different information may be produced from each query.

The system 8 then retrieves the information, or the information is returned, from one or many of any of the databases (108) (110) (112) (114) (116) to the processor 10 via another input 22 and further populates the memory 20 (118). The populated memory 20 signals the control unit with the populated meta data (120). The processor 10 acts on the meta data by identifying the meta data against the current agent list and current agent skill set based on the meta data (122). The processor 10 then produces an output 24 to send the call and information to the best available agent (124). If the best agent is not available (126) the system 8 goes through the action of identification of the best available agent (124) again providing to the best available agent every time. A signal is then sent from the processor 10 to the agent via another output 24 to the user interface 26 of the best available agent (128) with the available meta data and the call commences.

Figure 3:
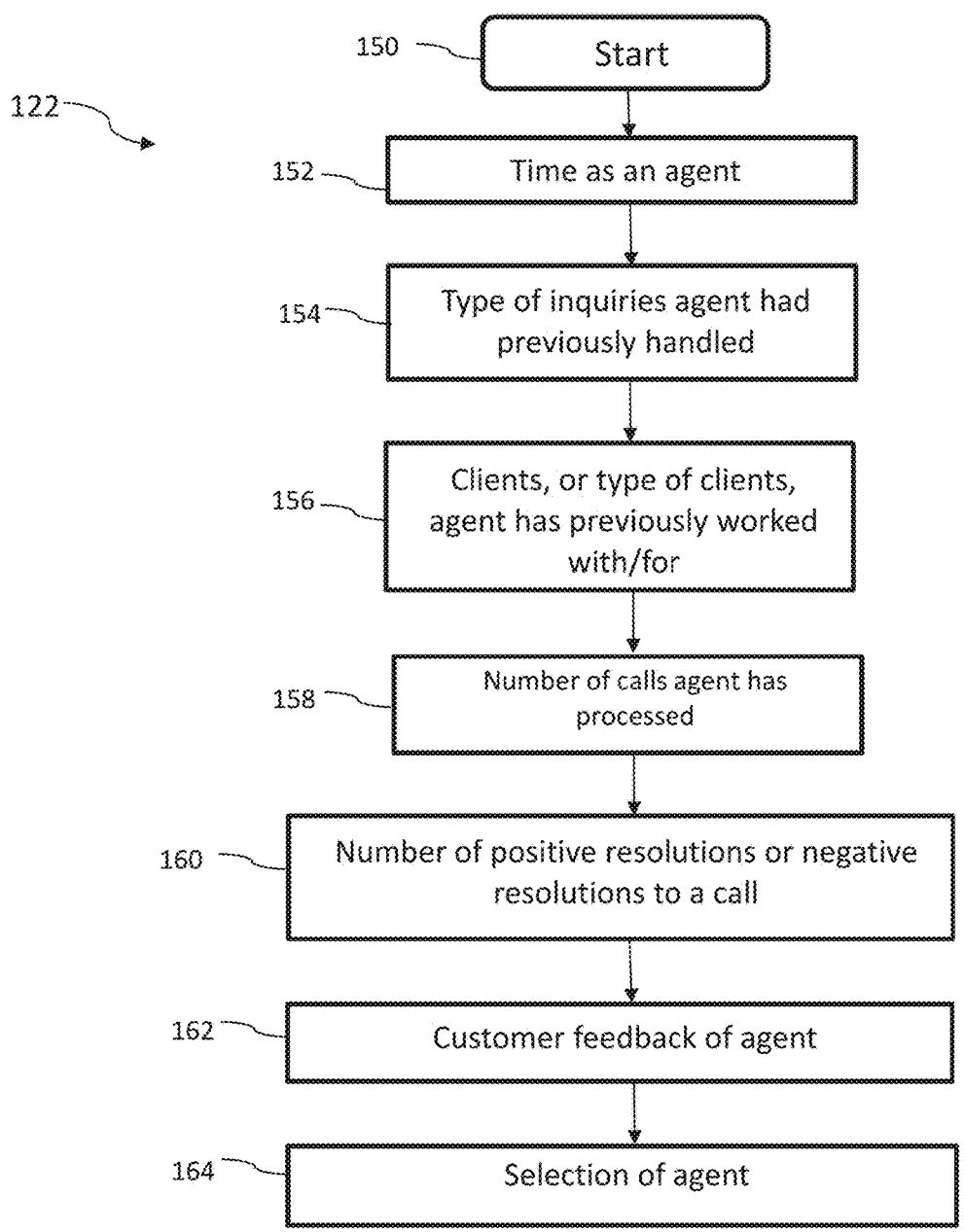
FIG. 3 illustrates a process flow diagram for agent selection for a given call.

Referring to FIG. 3, the action on the meta data by the system 8 within the processor 10 to identify the best agent for the call (122) may include identification through a sequence of an agents current skill set starting the sequence of choosing an agent (150) length of time as an agent (152), type of inquiry agent as dealt with previously (154), clients agent has work with previously (156), number of calls processed (158), number of positive resolutions or negative resolutions (160), customer feedback of agent (162) which leads to the selection (164) of the best appropriate or available agent for the call. It will be appreciated that the list of agent skills is only an example and not a conclusive list of other possible agent skills that may be input into the system 8 to pair with the information and enhanced meta data from the call.

Figure 4:
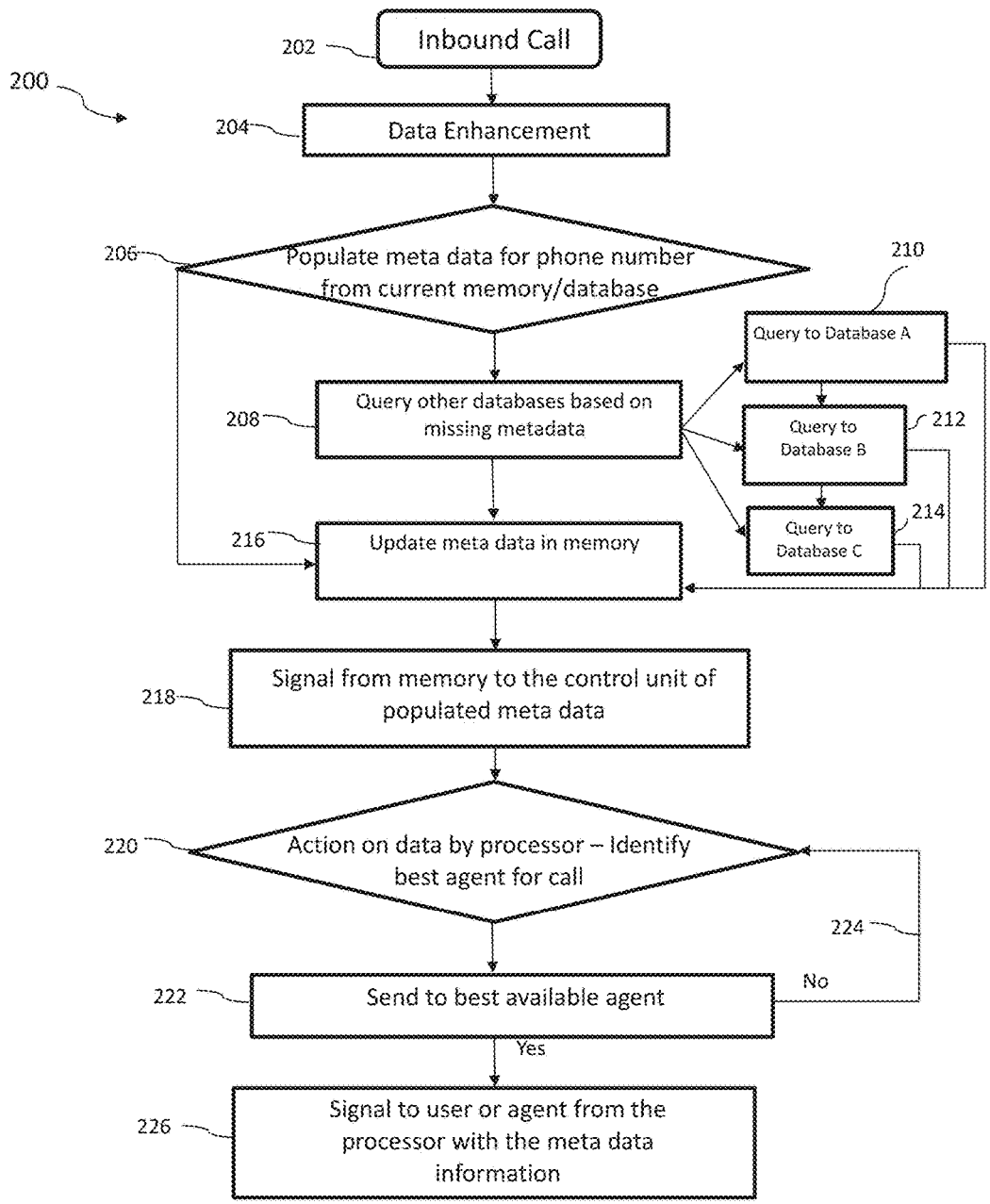
FIG. 4 illustrates a second process flow diagram which be used by the processor of FIG. 1 which may be for an inbound call.

Referring to FIG. 4 an alternative logic sequence (200) may be carried out through the system 8 via the processor 10. An inbound call (202) may signal the processor 10 for data enhancement (204). The memory 20 may populate information for an agent regarding the phone number from what currently resides in the system 8 (206). The information from the phone number itself may immediately update the data or meta data in the memory 20 (216). The system 8 may also identify missing data based on what is already populated in and retrievable in the memory 20. The missing data causes the system 8 to produce first outputs 14 to query alternative databases (208). The query to each database may extend to a first database which may then provide the second input 22 to the system 8 that is processed through the processor 10 (210). Another output 14 may be a second query may be to a second database which may then provide the second input 22 to the system 8 that is processed through the processor 10 (212). Another output 14 may be a third second query may be to a third database which may then provide the second input 22 to the system 8 that is processed through the processor 10 (214). It will be appreciated that although only three queries may be shown that an unlimited amount of queries may be placed.

Alternatively a single query 208 output 14 may come from the processor 10. The output 14 query may provide commands may query a first database and gather as much meta data as possible (210) which then queries a second data base and further enhances the meta data (212) which may then query a third database to further enhance the meta data (214). After the requested information is retrieved from the database then the second input 22 is processed and populates the memory 20 of the system 8 only after all the information available is retrieved and updates the memory (216). Again three databases or information centers are illustrated but any number of databases and information centers is contemplated to appropriately enhance the metadata and populate the queries from the system.

With the proper meta data the logic unit 18 signals the control unit 16 in the processor (218) to go through the logic of identifying the best agent for the call (220). Similar to the previous embodiment the identification of the best available agent goes through the same, or similar, logic sequence of FIG. 3 (122). The processor 10 then produces the output 24 to send the call and information to the best available agent (222). If the best agent is not available (224) the system 8 goes through the action of identification of the best available agent (220) again providing to the best available agent every time. A signal is then sent from the processor 10 to the agent via another output 24 to the user interface 26 of the best available agent (226) with the meta data available and the call commences.

Figure 5:
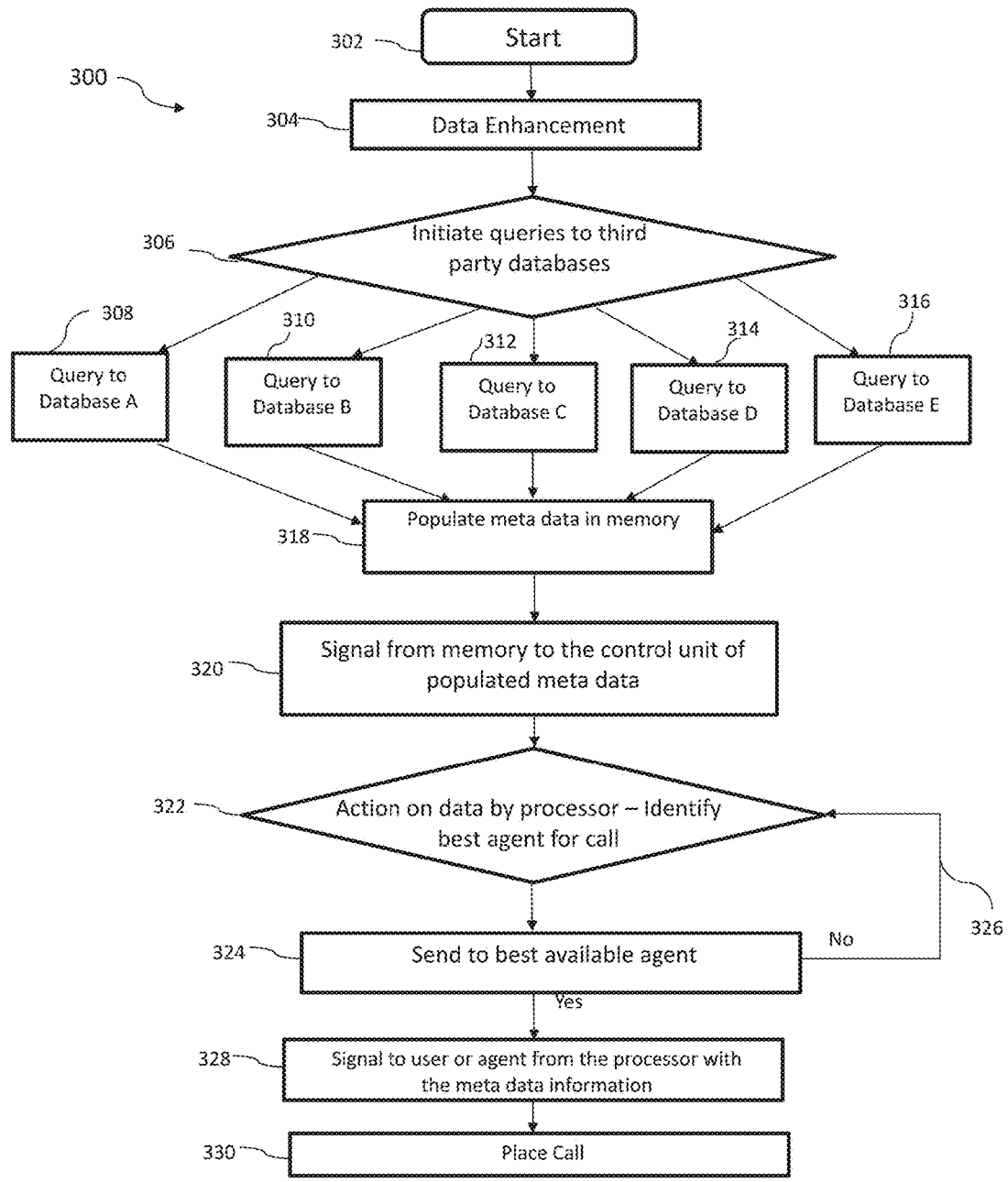
FIG. 5 illustrates a third process flow diagram which be used by the processor of FIG. 1 which may be for an outbound call.

Referring to FIG. 5, an alternative logic sequence (300) may be carried out through the system 8 via the processor 10. The system 8 intends to provide an outbound call number to an agent (the best available agent) at the start (302). The control unit 16 within the processor 10 provides a number (i.e. phone number) for data enhancement (304). The memory 20 may preliminarily provide meta data to the system 8 that may be accessible to an agent.

Not that dissimilar to the previous logic sequence (100) data enhancement (304) occurs with the logic 18 initiating queries or inquiries (306) to other databases which may be many different databases (308) (310) (312) (314) (316) or to a single data base. The queries (306) may occur simultaneously from a single output 14 or multiple output 14 queries. The queries (306) may be any of the many pieces of meta data previously disclosed herein or other pieces of meta data in addition to those previously listed herein. The queries (306) to a first database (308), which may be any one of (308) (310) (312) (314) (316) may be the same or different than the subsequent databases which may be any one of (308) (310) (312) (314) (316) and the same or different information may be produced from each query.

The system 8 then retrieves the information, or the information is returned, from one or many of any of the databases (308) (310) (312) (314) (316) to the processor 10 via another input 22 and further populates the memory 20 (318). The populated memory 20 signals the control unit with the populated meta data (320). The processor 10 acts on the meta data by identifying the meta data against the current agent list and current agent skill set based on the meta data (322). The processor 10 then produces an output 24 to send the phone number and information to the best available agent (324). If the best agent is not available (326) the system 8 goes through the action of identification of the best available agent (324) again providing to the best available agent every time. A signal is then sent from the processor 10 to the agent via another output 24 to the user interface 26 (328) with the available meta data. The system 8 then provides the phone number to the agent or the system places the call without the agent even knowing the phone number (330). The agent is able to access the meta data from the system 8 before or during the call.

Similar to the previous embodiments (100) (200) the identification of the best available agent goes through the same, or similar, logic sequence of FIG. 3 (122). The processor 10 then produces the output 24 to send the call and information to identify the best available agent (322). A signal is then sent from the processor 10 to the agent (328)

via another output 24 to the user interface 26 of the best available agent (326) with the meta data available and the call is placed (330).

Figure 6:
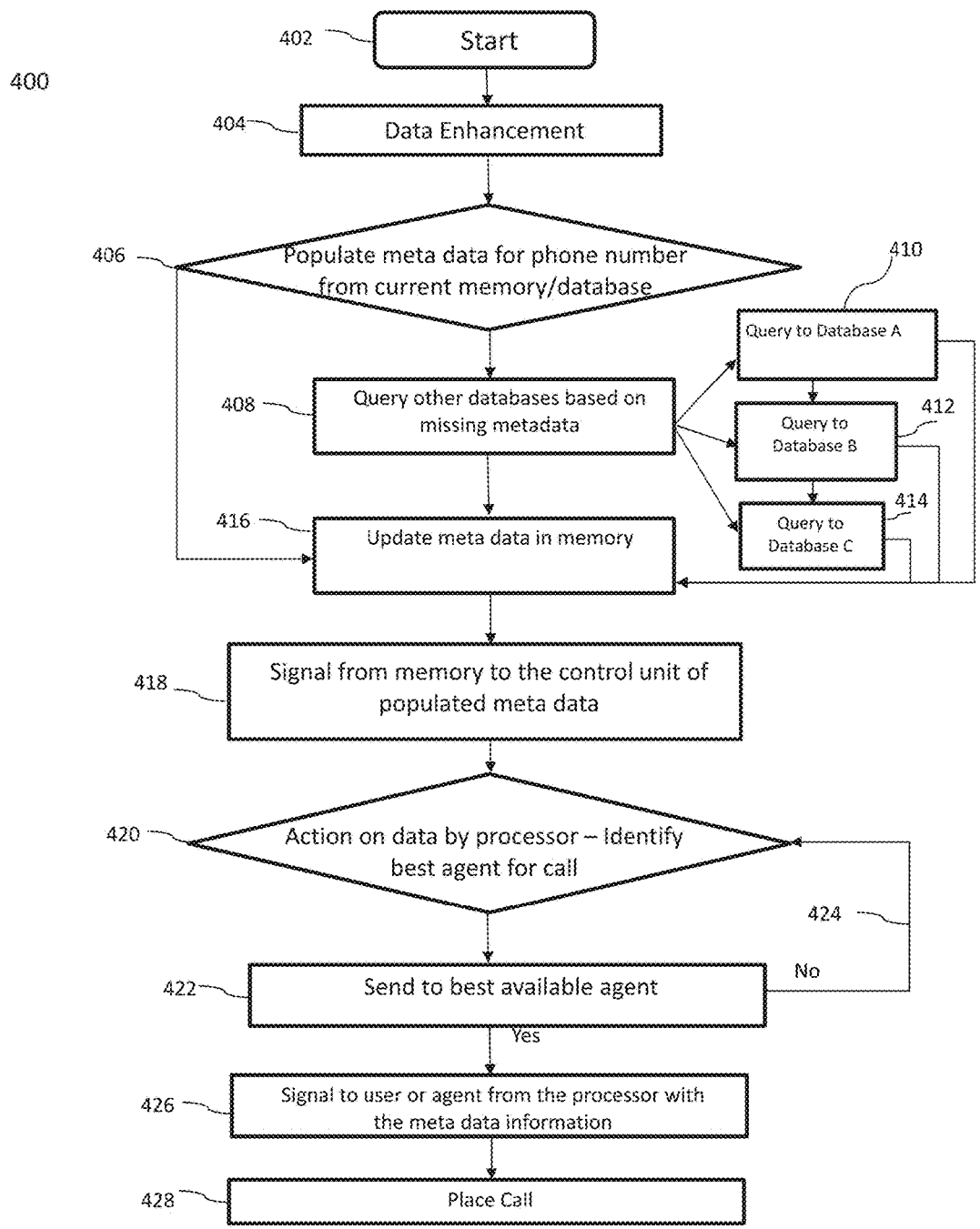
FIG. 6 illustrates a fourth process flow diagram which be used by the processor of FIG. 1 which may be for an outbound call.

Referring to FIG. 6 an alternative logic sequence (400) may be carried out through the system 8 via the processor 10. Similar to the previous logic sequence (300), the system 8 intends to provide an outbound call number to an agent (the best available agent) at the start (402). The control unit 16 within the processor 10 provides a number (i.e. phone number) for data enhancement (404). The memory 20 may preliminarily provide meta data to the system 8 that may be accessible to an agent.

Not that dissimilar to the previous logic sequence (100) data enhancement (404) occurs with the logic 18 initiating queries. The memory 20 may populate information for an agent regarding the phone number from what currently resides in the system 8 (406). The information from the phone number itself may immediately update the data or meta data in the memory 20 (416). The system 8 may also identify missing data based on what is already populated in and retrievable in the memory 20. The missing data causes the system 8 to produce first outputs 14 to query alternative databases (408). The query to each database may extend to a first database which may then provide the second input 22 to the system 8 that is processed through the processor 10 (410). Another output 14 may be a second query may be to a second database which may then provide the second input 22 to the system 8 that is processed through the processor 10 (412). Another output 14 may be a third second query may be to a third database which may then provide the second input 22 to the system 8 that is processed through the processor 10 (414). It will be appreciated that although only three queries may be shown that an unlimited amount of queries may be placed.

Alternatively a single query 408 output 14 may come from the processor 10. The output 14 query may provide commands may query a first database and gather as much meta data as possible (410) which then queries a second data base and further enhances the meta data (412) which may then query a third database to further enhance the meta data (414). After the requested information is retrieved from the database then the second input 22 is processed and populates the memory 20 of the system 8 only after all the information available is retrieved and updates the memory (416). Again three databases or information centers are illustrated but any number of databases and information centers is contemplated to appropriately enhance the metadata and populate the queries from the system.

With the proper meta data the logic unit 18 signals the control unit 16 in the processor (418) to go through the logic of identifying the best available agent for the call or provides the best available agent with the phone number (420). Similar to the previous embodiment the identification of the best available agent goes through the same, or similar, logic sequence of FIG. 3 (122).

The processor 10 then produces an output 24 to send the phone number and information to the best available agent (422). If the best agent is not available (424) the system 8 goes through the action of identification of the best available agent (422) again providing to the best available agent every time. A signal is then sent from the processor 10 to the agent via another output 24 to the user interface 26 of the best available agent (426) with the available meta data. The system 8 then provides the phone number to the agent or the system places the call without the agent even knowing the phone number (428). The agent is able to access the meta data from the system 8 before, during or after the call.

An example of enhanced agent skill matching may include (1) communication comes in from a certain phone number; (2) meta data enhancement occurs in line with that previously disclosed herein or other methods; (3) the system 8 determines the caller or the projected caller is from a specific geographic location (e.g. Chicago) and from another limitation of the geographic location (e.g. a suburb of Chicago); the system 8 identifies the phone number as a cell phone; and (5) the data is then matched to an agent who lived in the geographic location based on the meta data query and search between the caller/contact and the agent. Furthermore, when doing matching between agents and callers further enhancements may be done with data from the client's contact relation system to perhaps find that the caller is female or has called before about a specific issue and use that to further direct the call to the correct agent, or best available agent.

Age, sex, race, ethnicity and other information may be obtained from a phone number through meta data enhancement. Additionally, information regarding the agents may also be used to enhance the meta data and increase the agent skill matching; such information may also include the age, race, sex, ethnicity, and background of the agent.

The enhanced meta data does not only provide for increased agent skill matching the enhanced meta data now provides increased relevant fields. The system 8 may now select a caller identification (caller ID) from a group of caller IDs for any given all using the meta data from the caller ID provided and the phone numbers with the meta data now stored in the memory 20 from the queries and inquiries from the system 8.

A first example may include (1) meta data for a phone number is passed into the system via any of the previously disclosed methods; (2) rule or logic is to select closest caller ID based on longitude and latitude; (3) the system 8 may work through both the meta data sets and perform a generalized search against caller ID meta data in the system 8; and 4) allow for selection of the caller ID.

Another example may include (1) meta date for a phone number is passed into the system 8 via any of the previous methods disclosed here or previously populated meta data maintained in the memory 20 of the system 8 or general search engines; and (2) the rule or logic is to select closest caller ID based on longitude or latitude with further restrictions on the city and/or state.

Another example may include (1) meta date for a phone number is passed into the system 8 via any of the previous methods disclosed here or previously populated meta data maintained in the memory 20 of the system 8 or general search engines; and (2) the rule or logic is to select closest caller ID based on state with further restriction that the caller ID selected must be a cell phone (for those times when some communications may be over sms and some over voice as).

Each of these examples is to provide possibilities and each is meant to be restrictive and not exclusive. Variations of each of the possible limitations previously disclosed herein and even those not set forth herein are contemplated.

Figure 7:
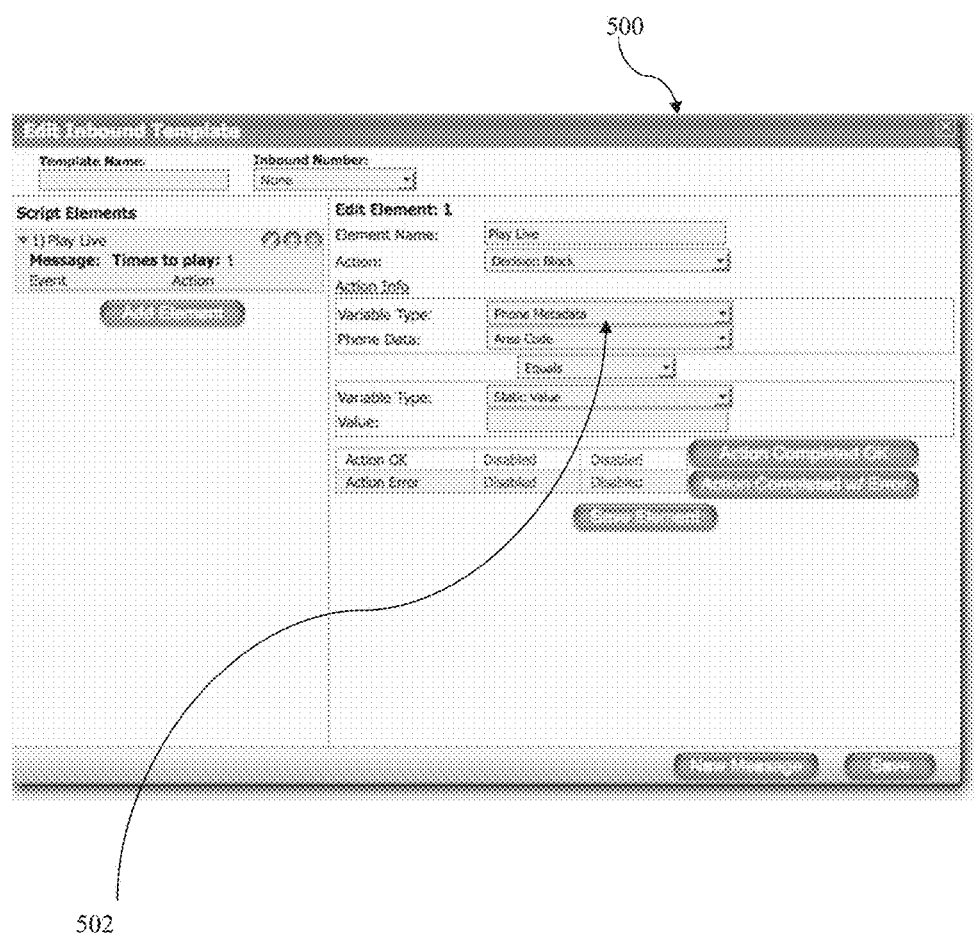
FIG. 7 illustrates an example of a first user interface page that may be accessed on computer or other electronic device.
Figure 8:
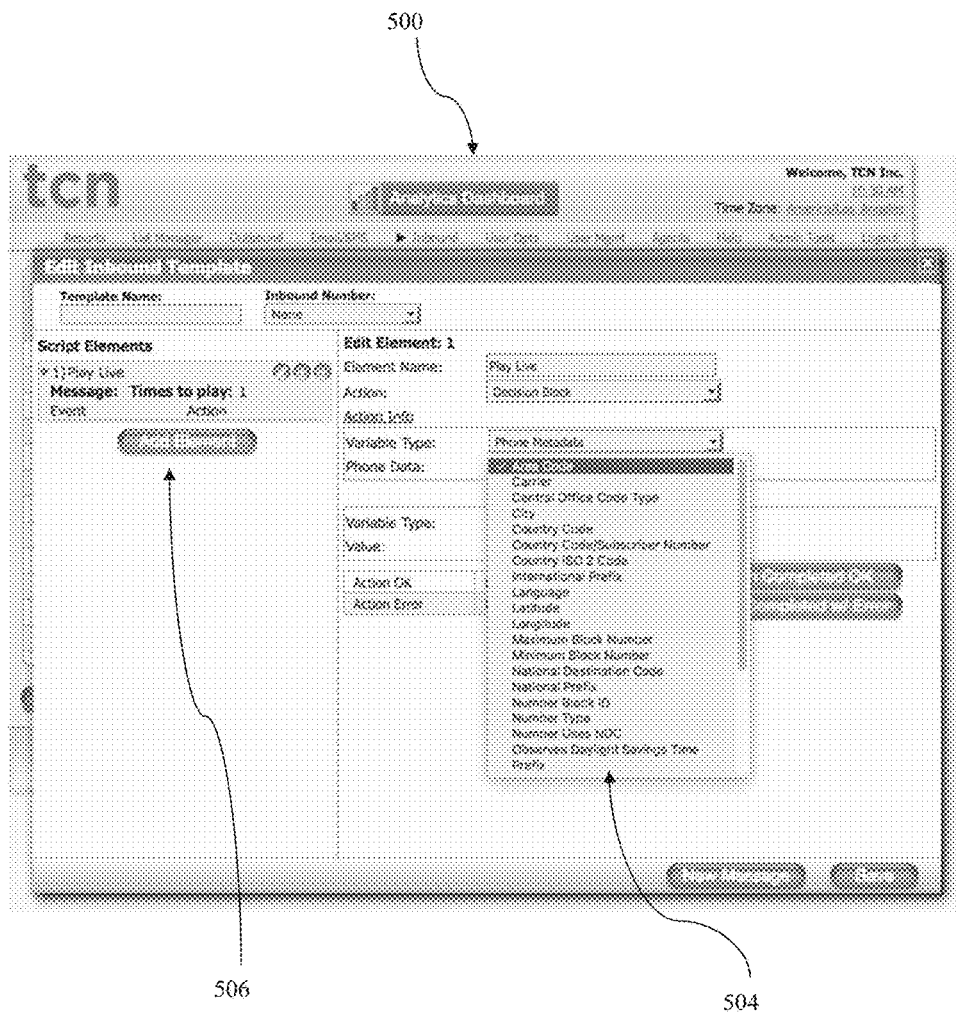
FIG. 8 illustrates a user interaction with the user interface page of FIG. 7.

Referring to FIGS. 7 and 8 a potential user interface 500 of the system 8 is illustrated that provide an agent, supervisor, client or other user access to the metadata. This meta data is accessible before after or during a call with a caller by the user. A user may click on the meta data window 502 that will provide a user a plethora of options of accessible meta data that has been populated from the system 8 from the methods previously described herein. A drop down menu 504 may allow the user to identify what portion of meta data the user desires to access. Alternatively a window may be utilized for user to "search" for specific meta data within the system 8. Furthermore if there is not an easily retrievable piece of meta data accessed from the menu a user may be able to add a short cut, or additional element 506, to the meta data that may further populate the drop down menu 504.

Although the foregoing description contains many specifics, these should not be construed as limiting the scope of the description or its embodiments or methods or of any of the appended claims, but merely as providing information pertinent to some specific embodiments that may fall within the scopes of the description and the appended claims. Features from different embodiments may be employed in combination. In addition, other embodiments of the description may also be devised which lie within the scopes of the description and the appended claims. The scope of the description is, therefore, indicated and limited only by the appended claims and their legal equivalents. All additions, deletions and modifications to the description, as disclosed herein, that fall within the meaning and scopes of the claims are to be embraced by the claims.

What is claimed:

1. A system for increasing meta data input and output, the system comprising:
 a processor programmed with predetermined logic sequences for gathering further meta data, the processor configured to:
  receive a first input signal;
  process a caller's information;
  signal a control unit within the processor to produce a first output to gather meta data from at least one of a plurality of sources;
  receive a second input the processor with meta data from the at least one of plurality of sources;
  populate the system with the meta data; and
  signal the control unit to provide a second output to a user, wherein the user is an agent with the best available skill set based on agent's data and on the meta data; and
 a user interface for access to the meta data.

2. The system of claim 1, wherein the first output comprises a single output to a plurality of sources.

3. The system of claim 1, wherein the first output comprises a plurality of outputs to a plurality of sources.

4. The system of claim 1, wherein the caller's information is a phone number.

5. The system of claim 1, wherein the processor is configured to:
 signal a memory unit within the processor to provide pre-populated meta data to the system based on a phone number;
 identify missing meta data; and
 provide a signal for the first output with appropriate plurality of sources to increase the amount of meta data.

6. The system of claim 5, wherein the user comprises an agent and the first input signal is an incoming call and the agent is receiving the incoming call.

7. The system of claim 6, wherein the processor is configured to send the second output to an agent to match the skill of the best available agent based on the meta data.

8. The system of claim 5, wherein the user comprises an agent and the first input signal is a phone number provided by the system for the agent to call.

9. The system of claim 1, wherein the processor is configured to:
 identify missing meta data; and
 provide a signal for the second output with the external sources appropriate to increase the amount of meta data.

10. The system of claim 9, wherein receiving a phone number comprises an incoming call and a user comprises a calling agent for receiving calls.

11. The system of claim 10, wherein the processor is configured to send the third output to an agent to match the skill of the best available agent based on the meta data retrieved from either from the memory of the processor or from the second input.

12. The system of claim 9, wherein the user comprises an agent and the first input signal is a phone number provided by the system for the agent to call.

13. A system for increasing meta data input and output, the system comprising:
 at least one processor programmed with predetermined logic sequences for gathering further meta data, the processor configured to:
  receive a phone number;
  process the phone number against current meta data within a memory within the processor of the system;
  signal a control unit within the processor to produce a first output of current meta data of the system wherein the output provides the meta data to a user interface wherein a user may access the first output;
  signal the control unit within the processor to produce a second output to gather further meta data from at least one external system source;
  receive a second input the processor with increased meta data from the at least external source;
  populate the system with the increased meta data; and
  signal the control unit to provide a third output to a user, wherein the user is an agent with the best available skill set based on an agent's data and the meta data; and
 a user interface for access to the meta data.

14. A system for utilizing meta data to provide agent skill matching, the system comprising:
 at least one processor programmed to provide a call to an agent, the processor configured to:
  receive a phone number;
  process the phone number against current meta data within a memory within the processor of the system;
  process an agent's skills against the current meta data within the system; and
  signal a control unit within the processor to produce a first output of current meta data of the system to a best available agent based on current meta data and the agent's skills wherein the output provides the meta data to a user interface wherein the best available agent, based on an agent's data, may access the first output;
  identify missing meta data; and
 a user interface for access to the meta data.

15. The method of claim 14, wherein the processor is configured to, with regard to the missing meta data:
 signal the control unit within the processor to produce a second output to gather further meta data from at least on external source; and
 receive a second input into the processor to populate any missing meta data into the memory from the at least on external source.

16. The system of claim 15, wherein the processor is configured to signal the control unit to provide a third output to the best available agent.

17. The system of claim 15, wherein receiving a phone number comprises an incoming call.

18. The system of claim 15, wherein the first input signal is a phone number provided by the system for the agent to call.

\* \* \* \* \*